Oct. 21, 1958     J. T. VILLANUEVA     2,857,257
GAS PRODUCING APPARATUS
Filed Aug. 31, 1953     4 Sheets-Sheet 1

INVENTOR
JUAN T. VILLANUEVA
BY
Michael S. Striker
ATTORNEY

Oct. 21, 1958   J. T. VILLANUEVA   2,857,257
GAS PRODUCING APPARATUS
Filed Aug. 31, 1953   4 Sheets-Sheet 3
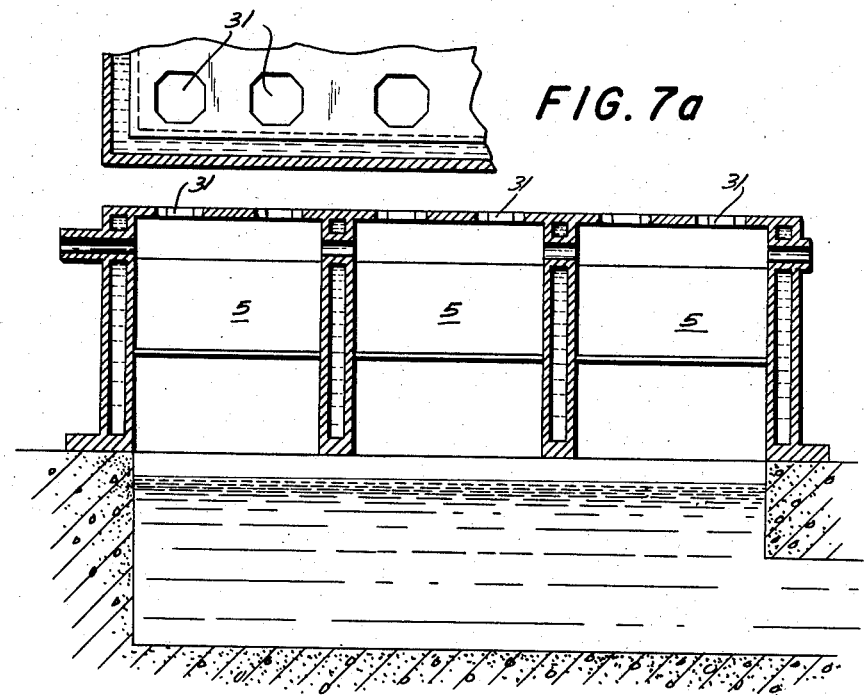
FIG. 7a
FIG. 7
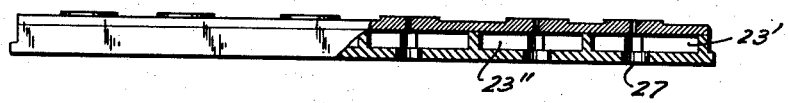
FIG. 5a
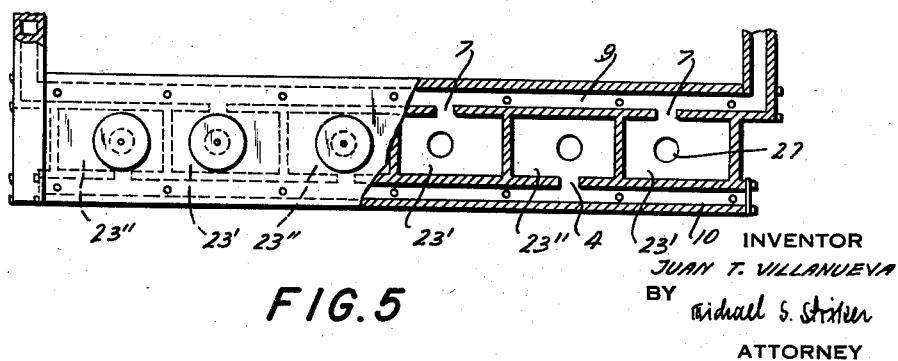
FIG. 5
INVENTOR
JUAN T. VILLANUEVA
BY
ATTORNEY United States Patent Office 2,857,257
Patented Oct. 21, 1958

2,857,257

GAS PRODUCING APPARATUS

Juan T. Villanueva, Quezon City, Republic of the Philippines

Application August 31, 1953, Serial No. 377,583

7 Claims. (Cl. 48—76)

This invention is a radical departure of the present practice of gas producing which has its origin in the Siemens regenerative furnace. In gas producers designed to this date, whether of the ascending or rising gas flow, descending gas flow or double or mixed gas flow systems, the fundamental principle of reducing the carbon dioxide ($CO_2$) and steam (gaseous $H_2O$) to combustible carbon monoxide (CO) and hydrogen ($H_2$) is effected in a haphazard sort of manner leaving absolutely to chance the related processes of the combustion of carbon (C) to carbon dioxide ($CO_2$) and subsequent reduction of said carbon monoxide (CO) as the gas goes through layers of incandescent carbonaceous fuel. Control of the amount of carbon dioxide ($CO_2$) produced has been possible to a certain extent by temperature. However, absolute removal of the carbon dioxide ($CO_2$) gas has not been possible, thereby lowering the already poor quality of the gas which would otherwise be of higher calorific value with the total absence of the carbon dioxide ($CO_2$) and if possible, the elimination of the original nitrogen ($N_2$) and the rare gases of the air.

I propose to generate producer gas positively, that is to say, under control where the tar and carbon dioxide ($CO_2$) gas can be totally eliminated by following the phenomenon observed when smokers start to smoke a cigarette, a pipe or a cigar, preferably the latter. As will be observed upon sucking a lighted cigar, air admitted through the glowing sigar tip gets into the smoker's mouth as carbon dioxide ($CO_2$). If this puff of carbon dioxide ($CO_2$) gas is not swallowed or expelled through the mouth but is pushed back through the cigar, it emerges in the form of a combustible gas that flares up suddenly at the approach of a flame, say from the lighted match itself. The gas mixture, thus burning into a flame is a mixture of carbon monoxide (CO) and hydrogen ($H_2$) liberated from the reduced moisture or $H_2O$ from the smoker's breath.

One of the objects of the present invention is to provide a gas producing process which reduces all $CO_2$ to CO and all $H_2O$ to $H_2$.

Another object of the invention is to provide a simple apparatus for carrying out this process.

A further object of the present invention is to provide a gas producer with a means for automatically reversing the flow of gas therethrough.

An additional object of the present invention is to provide a single drive means for controlling the flow of gases through the gas producer and for rocking the grates which support the burning fuel.

With these objects in view, the present invention mainly consists in a gas producer apparatus comprising in combination with other elements, partition means located in a substantially vertical plane, a pair of grates respectively located on opposite sides of this partition means and defining a bottom of a combustion chamber which is open at its top, fluid supply means communicating with the under side of one of the grates for supplying a fluid through this one grate to a portion of the combustion chamber located over the partition means, and fluid discharge means communicating with the under side of the other grate for drawing the fluid from the portion of the combustion chamber located over the partition means through the other grates and discharging the fluid from the apparatus.

Preferably, the apparatus includes also control means associated with the fluid supply and the fluid discharge means for connecting the fluid supply means to one of the grates and vice versa so that the fluid through the combustion chamber may be reversed in a predetermined sequence.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Fig. 5 is a partially sectioned plan view of part of the apparatus shown in Fig. 3;

Fig. 5a is a partially sectioned side view of Fig. 5;

Fig. 7 is a cross-section taken substantially along the line 7—7 of Fig. 6; and Fig. 7a is a partially sectioned top view of part of the structure shown in Fig. 7.

Figure 1:
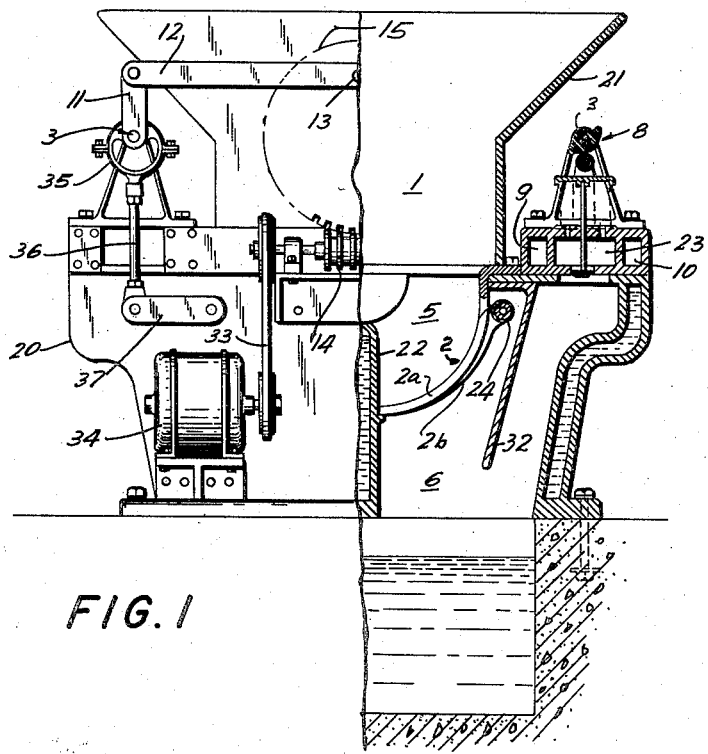
Fig. 1 is a partially sectioned front elevation of the apparatus of the present invention.
Figure 2:
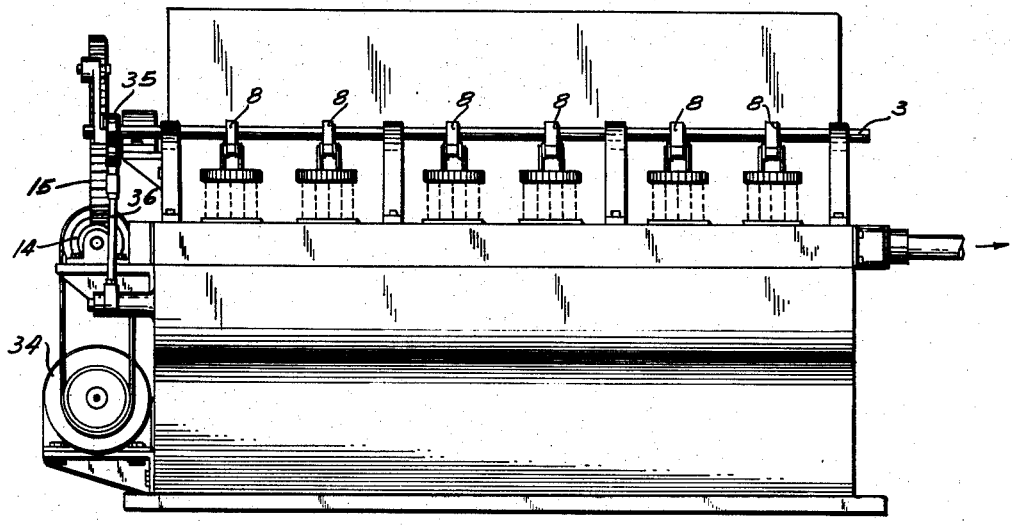
Fig. 2 is a side elevation thereof.
Figure 3:
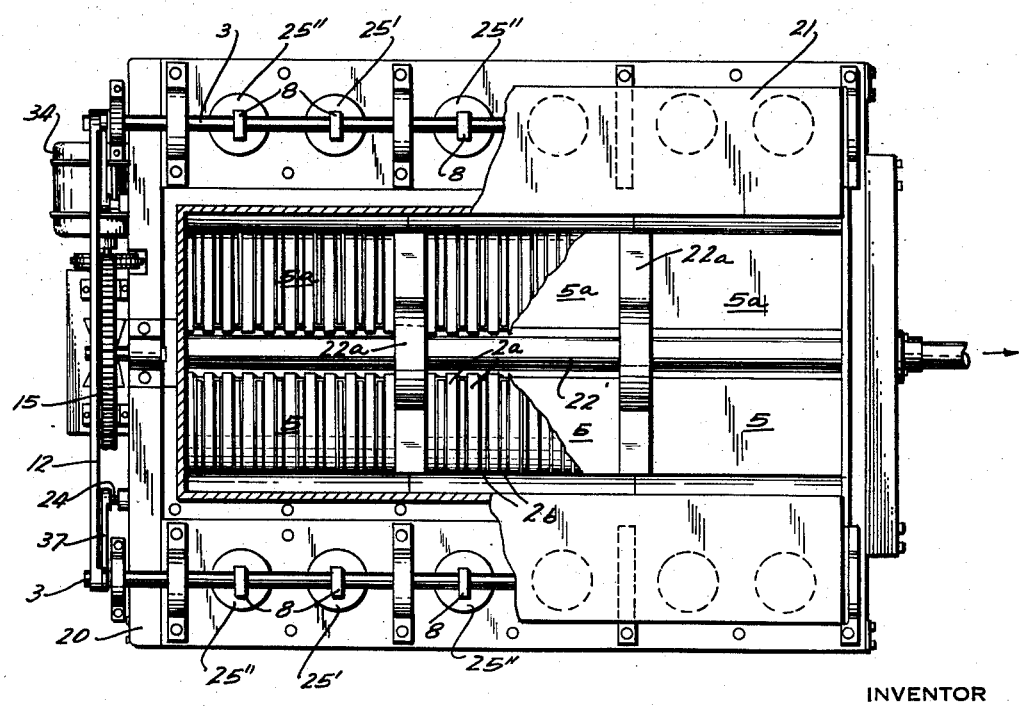
Fig. 3 is a partially sectioned plan view thereof.

Referring now to the drawings and more particularly to Figs. 1—3 of the same, it will be seen that the gas producer apparatus of the present invention comprises a casing 20 on which a hopper 21 is fixedly mounted by means of screws or the like. The walls of the hopper and part of the walls of the lower casing constitute wall means which define a combustion chamber which is open at the top thereof. Located in the lower part of this combustion chamber are partition means formed by a partition wall 22 extending centrally located through the whole length of the combustion chamber 1 and a pair of transverse walls 22a (Fig. 3) extend substantially equally spaced from each other and from the end walls of the casing 20 substantially normal to the partition 22 transversely through the lower portion of the combustion chamber. The walls 22 and 22a divide the lower portion of the combustion chamber 1 in a plurality of chambers 5 and 5a located respectively on opposite sides of the longitudinal partition wall 22. Located in each of the chambers 5 and 5a is a grate 2, which grates form together the bottom of the combustion chamber 1. Each of grates comprises, as clearly shown in Figs. 1 and 3, a plurality of equally spaced stationary grate bars 2a and a plurality of equally spaced rockable grate bars 2b respectively located between adjacent stationary bars 2a and fixed to a shaft 24 to be moved thereby, as described below.

The apparatus comprises further a pair of intake manifolds 10 respectively mounted on the casing 20 on opposite sides of the partition 22 and a pair of discharge manifolds 9 also mounted on the casing 20 and substantially parallel to and spaced from the pair of intake manifolds 10. Located between the parallel lines of intake manifolds 10 and the discharge manifolds 9, which are respectively located on opposite sides of partition 22, are a plurality of enclosures and a pair of enclosures 23' and 23'' are provided for each chamber 5 and 5a shown in the apparatus. The enclosures 23' communicates respectively through openings 7 with the discharge manifold 9, whereas the enclosures 23'' communicate respectively through openings 4 with the intake manifold 10.

Figure 4:
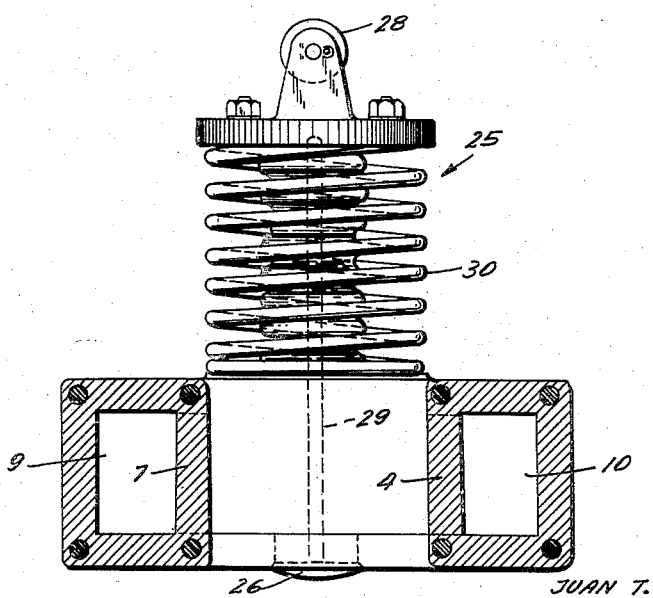
Fig. 4 is a partially sectioned side view of one of the valve units of the apparatus drawn to an enlarged scale.

Mounted on each of the enclosures 23 is a valve, best shown in Fig. 4. This valve generally designated with 25 comprises a valve member 26 adapted to open and close an aperture 27 in the bottom wall of the respective enclosure 23, a cam roller 28 connected to the valve member 26 by a valve rod 29, and a spring 30 tending to keep the valve member 26 in a position where it closes the aperture 27. Each of the apertures 27 communicates with a corresponding aperture 31 (Figs. 7 and 7a) respectively provided in the top wall of the casing 20 and baffle plates 32 extending downwardly from the top wall of the casing 20 on opposite sides of the partition 22 direct the air entering and leaving the apparatus to and from spaces 6 located below the grates 2 as will be described below in further detail. The outlet valves associated with the enclosures 23' communicating with the discharge 9 are designated with 25' and the inlet valves associated with the enclosures 23'' communicating with the inlet manifold are designated with 25'' (Figs. 3 and 5).

The roller 28 of each valve 25 is engaged by a cam 8, which cams are respectively mounted on shafts 3 for rotation therewith. Connected to each of the shafts 3 is a crank 11 the free ends of which are respectively pivotally connected to the free ends of an elongated bar 12, which in turn is pivotally connected approximately at the center thereof by means of a pivot pin 13 to a gear wheel 15 rotatably mounted on the left side wall of the casing 20, as best seen in Fig. 3. Meshing gear 15, for driving the same, is a worm 14 which in turn is driven over the belt drive 33 from the motor 34 (Figs. 1 and 2).

Connected to each of the shafts 3 is also eccentric 35 respectively connected by a rod 36 to one end of a crank 37, the other end of which is fixedly connected to the shaft 24 on which the rockable grate rods 2b are mounted. The motor 34 will therefore not only drive the shafts 3 on which the cams 8 for operation of the valves 25 are mounted but, at the same time, will also drive the shafts 24 for rocking of the bars 2b of the grates.

Figure 6:
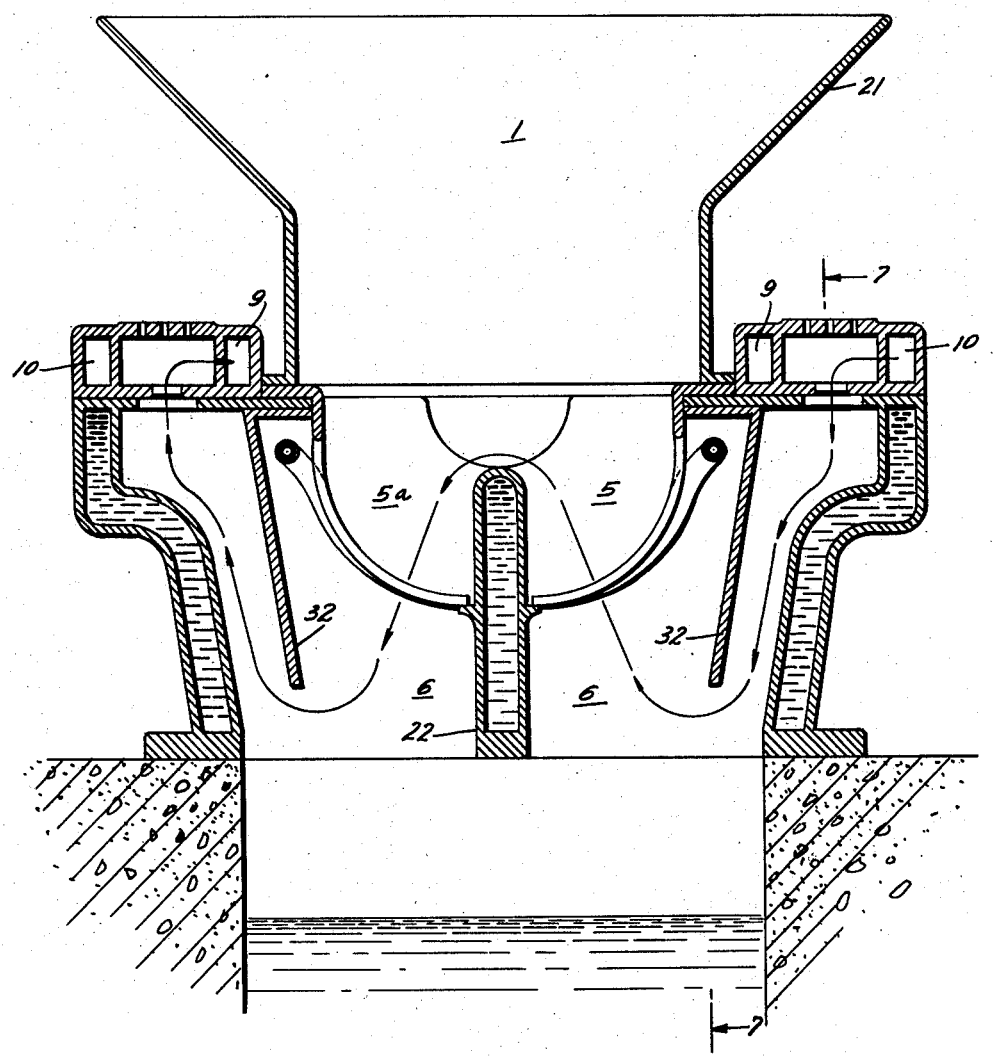
Fig. 6 is a transverse cross-section of the apparatus drawn to an enlarged scale with part of the elements shown in Fig. 1 removed and indicating the fluid flow in a given instant through the apparatus.

Whilst in Fig. 6, the transversal cross section of the machine shows water jackets to protect the walls of metal, in contact with the fire, from overheating, the actual machine could be built instead with refractory insulation, which would very likely contribute to a better performance of the machine due to the absence of any cooling effects which limit the temperature of the mass of fuel in contact with the walls. The only objection to such a form of construction of the machine is the magnitude which will result with the use of refractory insulation or material.

The apparatus described above will operate as follows: Inlet valve 25'' is opened by cam at 8 and air from air-intake manifold 10 is sucked in through opening 4 (See Fig. 5) and the glowing fire bed in chamber 5 (see Figs. 1 and 6) carried by grate 2 through the mass of fuel at the lower part of the combustion chamber, thereby producing carbon dioxide ($CO_2$) and carbon monoxide (CO) caused by reduction of the carbon dioxide ($CO_2$) gas by successive top layers of glowing fuel. In case of non-carbonized matter containing tar or creosote and oil products, the creosote and tarry vapors are formed by the heating of the green fuel and together with the carbon monoxide (CO) and carbon dioxide ($CO_2$) gases, are sucked slowly through the glowing fire bed in chamber 5a carried by adjoining similar fire grates thereby decomposing the creosote and allied organic matter into carbonized and gaseous fuels and reducing all the carbon dioxide ($CO_2$) and water ($H_2O$) to carbon monoxide (CO) and hydrogen ($H_2$) so that the gases continuing their way through space 6 and exhaust valve 25' through the exhaust opening 7 (see Figures 5, 6 and 7) into gas manifold 9 would in reality be a mixture of CO, $H_2$, the original nitrogen ($N_2$) of the air and of course the rare inert gases of the atmosphere. Thus, it will be seen that the walls separating the fire beds from each other form partition means, whereas the intake manifold 10 communicating through openings 4 with enclosures located between manifold 9 and manifold 10 together with the intake valves 25 form a fluid supply means. The manifold 9, on the other hand, communicating through opening 7 with other enclosures located between manifold 9 and manifold 10 and discharge valves 25' form a fluid discharge means, the fluid supply means and fluid discharge means together forming a fluid guiding means. It should be noted that each of the enclosures is formed as most clearly seen in Figs. 5 and 6 of the drawings with an opening in the bottom wall thereof and that the intake valves 25'' as well as the discharge valves 25' are operatively connected to the respective enclosures for opening and closing the openings formed in the bottom walls thereof. The cams and the parts for operating the same described below form a control means for controlling the fluid supply means and the fluid discharge means.

As the cam shafts 3 continue turning the inlet valve 25'' of chamber 5 is closed and the exchange valve 25' opened, while in chamber 5a the exhaust valve 25 is closed and the inlet valve 25'' is opened, reversal of flow through fire beds is effected in the most convenient sequence, depending upon arrangement or relative position of the cams 8 to the chambers 5 and 5a of the machine so that combustion or oxidation beds become reduction beds while reduction beds turn into oxidation beds and the flow of gas is continuous, i. e., not intermittent.

The fact that tar bearing gases are directly brought in contact with an incandescent mass of fuel in a down draft direction right after its generation in an up draft passage through layers of green fuel following combustion in an adjoining layer of fuel also in incandescence, that is to say, without being guided to pass through valves or ports, is very significant, as such a provision precludes the possibility of tar condensation in the valves or ports which is known to be a nuisance and undoubtedly would be a probable defect of the machine as proposed.

With the machine described having six fire beds, because of the communication between the beds, the cams 8 may be set so that at any one time, two of the fire beds will always be combustion beds while the four remaining beds will be reducing beds. The flow therefore of carbon dioxide ($CO_2$) and creosote or tar vapor or allied organic gaseous matter through the fire beds for reduction is only half of the flow through the two combustion beds, thus securing thorough burning of the cresote and complete reduction of the carbon dioxide ($CO_2$) gas to combustible carbon monoxide (CO).

As will be observed, the flow through any oxidation bed is exactly the operation which goes on in an ascending or rising gas flow type of gas producer, so that the gas which will come out of the glowing and heated mass of fuel is a mixture of mostly producer gas that is hydrogen ($H_2$) and carbon monoxide (CO), nitrogen ($N_2$), and the rare gases of the air not affected by the heat and hot fuel, unreduced water vapor ($H_2O$), evaporated creosote or tar, if raw vegetable or bituminous fuel is used and a substantial percentage by volume of carbon dioxide ($CO_2$) which had no chance of being reduced to carbon monoxide (CO) in going through the incandescent mass.

Upon subsequently making this impure mixture of gases slowly and diffusedly go through two or more reduction beds, through which gases from a neighboring oxidation bed are made to travel downwards as in a descending gas flow type of gas producer, all such impurities as creosote or tar, water vapor and carbon dioxide ($CO_2$) are converted into additional useful gaseous fuels upon contact with incandescent carbon. The cresote or tarry vapors of organic chemical composition, i. e., carbon containing substances, are burnt into a charred or carbonized fuel whilst the water ($H_2O$) vapor is converted into "water gas," i. e., carbon monoxide (CO) and hydrogen ($H_2$), and the carbon dioxide ($CO_2$) into air gas or carbon monoxide (CO). It is obvious, therefore, that the emerging gas is purely a mixture of combustible gases, i. e., carbon monoxide (CO) and hydrogen ($H_2$) adulterated by the addition of the nitrogen ($N_2$) and the rare gases of the air which go with it.

We have thus accomplished in this machine the results which justify the advent of the double or mixed gas flow type of gas producers—namely, the tarless generation of producer gas from green fuel—with the added advantage of "control" or better yet—positive and effective execution thereafter of the processes of oxidation or combustion and reduction of the gases which have resulted from the burning of the fuel, as well as the destruction or breaking up of the unavoidable emerging tarry gases in order to preclude their existance in the final combustible mixture of the gases obtained.

The flow of either fresh air or combustion gases through the fuel bed is kept timed in successive order by the opening and closing of air intake and gas outlet poppet type valves which are operated by cams on camshafts 8.

In the machine as proposed, the gases which are guided through all the valves do not contain tarry or creosote vapors, pure air being directed through the intake valves whilst the tarless generated gaseous fuel or clean producer gas is actually what is sucked or pushed out through the exhaust valves, i. e., depending on whether the machine is a suction or a pressure producer.

All the fire grates 2a have a rocking motion imparted by two shafts each of which has three grates connected to it.

To insure against any possible leakage of gaseous fuel through the stems of the exhaust valves of the machine, these valves are provided with bellows having the same general construction as the metallic bellows of steam heating systems but built up to resist the higher temperatures which will have to be met.

(Crankpin 13 (Fig. 1) turning with worm wheel 15 transmits motion through a draw bar 12 and cranks 11 to the camshafts 8. On the other hand, worm wheel 15 derives its motion from worm 14 which in turn is driven by a small electric motor, through V-belts or texropes and corresponding V-grooved sheaves.) Any suitable fans, blowers and the like are associated with the manifolds 9 and 10 to move gases therethrough.

Therefore, the invention includes the following features:

(1) The observation of the generation of producer gas following the principle of prolonged lighting of smoker's cigarettes and cigars, especially the latter, as hereinabove specified;

(2) The practical application of the principle in a machine as described, having intake and exhaust valves, either popet or otherwise where the chamber would theoretically be closed but in actual practice might be left opened when the machine operates as a suction producer without addition of steam or water vapor within the chamber and when kept well fed up to the top with well packed fuel which will prevent air from being sucked in from the top;

(3) The controlled generation of clean gas, free from creosote or tar and carbon dioxide ($CO_2$), out of waste matter such as sawdust, dry leaves, wood shreds, cereal hulls, etc. provided the material is thoroughly dry;

(4) The draw bar arrangement making possible simultaneous operation of cam shafts and grate rocking mechanism;

(5) The incorporation of gas-proof metallic bellows in the design of the popet exhaust valves of the machine to insure against gas leakage through the joints between the stems of the valves and the bores through the corresponding valve casting;

(6) The application of the machine herein described or the principle involved in the operation thereof in physico-chemical operations, wherein the slow flow of a fluid, whether gaseous or liquid with intermittent reversals thereof through a porous mass of a solid substance is a requirement in order to obtain the desired nature of the resulting fluid products.

It will be understood that each of the elements described above, or two or more together, may also find a useful application in other types of gas producing process and apparatus differing from the types described above.

While the invention has been illustrated and described as embodied in reversible gas producing process and apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a gas producer apparatus, in combination, wall means forming a combustion chamber which is open at the top; upwardly extending partition means located within said combustion chamber; a pair of grates respectively located on opposite sides of said partition means and defining together the bottom of said combustion chamber; fluid supply means connectable to each of said grates for supplying fluid into said combustion chamber through the respective grate; fluid discharge means connectable to each of said grates for discharging fluid from said combustion chamber through the respective grate; and control means connected with said fluid supply and fluid discharge means for selectively connecting said fluid supply means to one of said grates while connecting the fluid discharge means to the other of said grates, so as to supply fluid through one of said grates into said combustion chamber while withdrawing fluid from said combustion chamber through the other of said grates, and alternatively, connecting, said fluid supply to said other grate while connecting said fluid discharge means to said one grate so as to supply fluid through said other grate into said combustion chamber while withdrawing fluid therefrom through said one grate.

2. Gas producer apparatus as defined in claim 1 and wherein said control means comprise valve means respectively located in said fluid supply means and fluid discharge means, cam means engaging said valve means for opening and closing said valve means in sequence, and drive means for operating said cam means.

3. Gas producer apparatus as defined in claim 2 and wherein said grates are rockably mounted on said apparatus and including rocking means for rocking said grates, and connecting means for connecting said rocking means with said drive means so that said drive means will rock said grates while operating said cam means.

4. Gas producer apparatus comprising, in combination, wall means forming a combustion chamber which is open at the top; upwardly extending partition means located in the lower portion of said combustion chamber and dividing said lower portion in a plurality of chambers open at the bottom and the top and located on opposite sides of said partition means; a grate located in each of said chambers, said grates forming together the bottom of said combustion chamber; a pair of intake manifolds mounted on said wall means and respectively on opposite sides of said partition means; a pair of discharge manifolds mounted on said wall means, respectively on said opposite sides of said partition means, being substantially parallel to and spaced from said pair of intake manifolds, respectively; a pair of enclosures associated with each of said chambers, each pair of enclosures being located adjacent the respective chamber between the parallel lines located on the same side of said partition means as said chamber of said intake and discharge manifold, one of said enclosures of each pair of enclosures communicating with the respective intake manifold and the other with the respective discharge manifold; passage means leading from each of said pair of enclosures to the under side of the grate in the respective chamber coordinated with the pair of enclosures; valve means mounted on each enclosure of each of said pair of enclosures, said valve means being movable between an open position and a closed position and connecting when in open position the respective enclosure on which they are mounted with the passage means leading from said enclosure to the chamber connected thereto; cam means engaging said valve means for selectively opening one of the valve means in each pair of said enclosures while closing the other of said valve means on each pair of said valve means, and alternatively, closing said other of said valve means on each pair of said enclosures while opening said one valve means; and drive means for operating said enclosures in sequence.

5. Gas producer apparatus as defined in claim 4 in which said drive means comprise a pair of cranks located on opposite sides of said wall means and being fixedly connected to said cam means, an elongated bar pivotally connected at opposite ends thereof to said cranks, respectively, and a wheel mounted for rotation about its axis on said wall means and being pivotally connected at the point other than its axis to said bar intermediate the end thereof.

6. Gas producer apparatus as defined in claim 4 and wherein each of said valve means comprises a valve stem passing through a wall portion of each enclosure and a flexible bellows located about said valve stem and being fixed at one end to said enclosure and at an opposite end to said valve stem to prevent fluid from leaking out of said enclosure about said valve stem.

7. Gas producer apparatus as defined in claim 5, said grates being rockably mounted on said support means and said pair of cranks being respectively connected to a pair of cam shafts forming part of said cam means; a pair of discs eccentrically fixed to each of said crank shafts for rotation therewith; a pair of ring means respectively located about said discs and slidably engaging the peripheries thereof; a pair of connecting rods respectively fixed to said rings; and an additional pair of cranks respectively connected to said pair of grates and being pivotally connected to said pair of connecting rods, respectively, so that said drive means rocks said grates in addition to operating said cam means.

References Cited in the file of this patent

UNITED STATES PATENTS

| | | |
|---|---|---|
| 409,062 | Peters | Aug. 13, 1889 |
| 944,332 | Jabs | Dec. 28, 1909 |
| 1,329,744 | Benjamin | Feb. 3, 1920 |
| 1,509,667 | Catlin | Sept. 23, 1924 |
| 1,571,877 | McElroy | Feb. 2, 1926 |
| 1,743,726 | Murdock et al. | Jan. 14, 1930 |
| 1,869,949 | Szikla | Aug. 2, 1932 |
| 1,900,141 | Van Heeden | Mar. 7, 1933 |
| 1,938,139 | Ekelund | Dec. 5, 1933 |
| 1,941,809 | McKee | Jan. 2, 1934 |
| 1,964,207 | Koller et al. | June 26, 1934 |
| 2,088,679 | Yamazaki | Aug. 3, 1937 |